G. W. GROVE.
BEAM-SCALE.
No. 183,156. Patented Oct. 10, 1876.
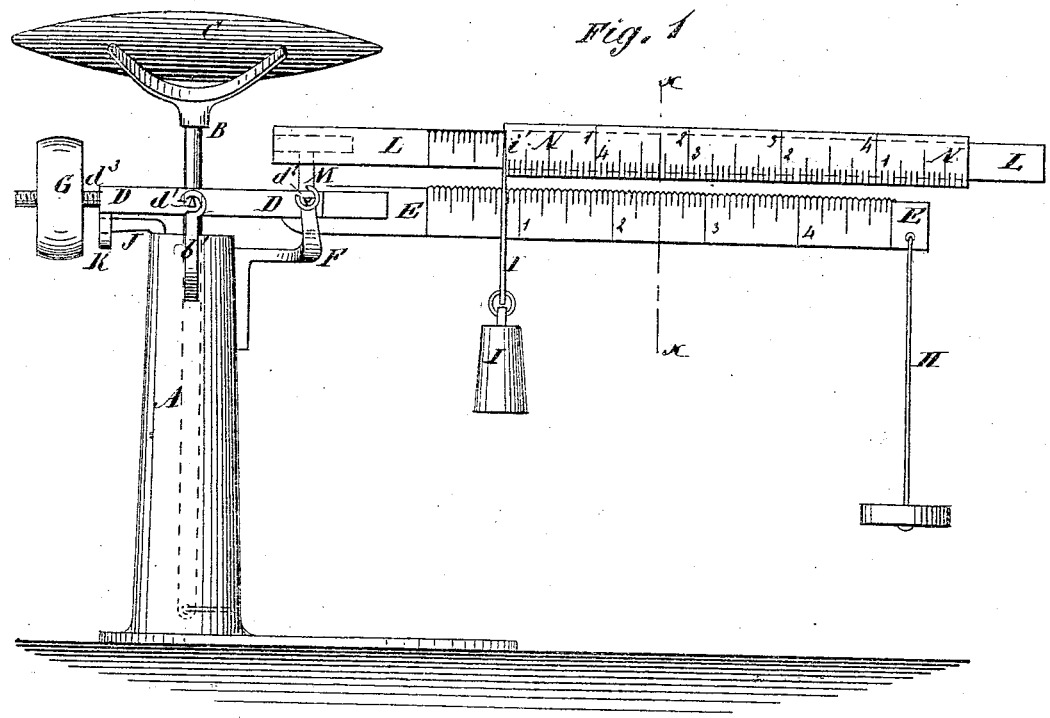
Fig. 1
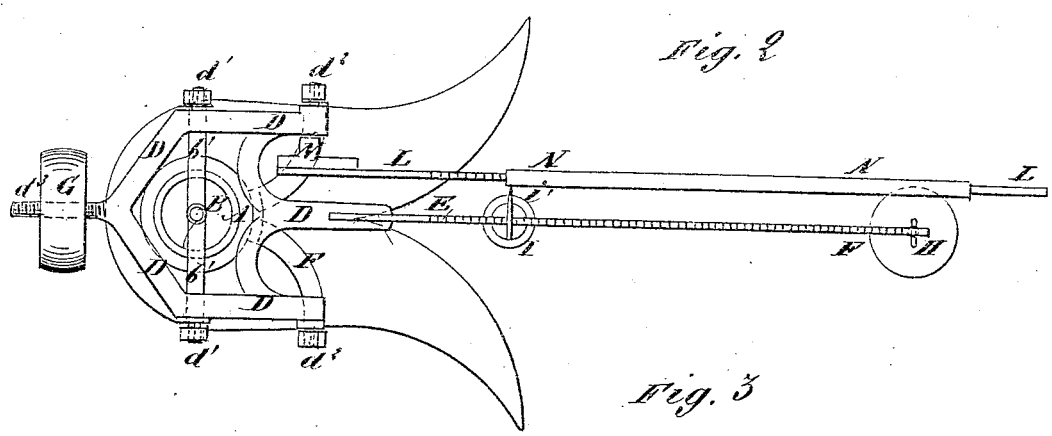
Fig. 2
Fig. 3
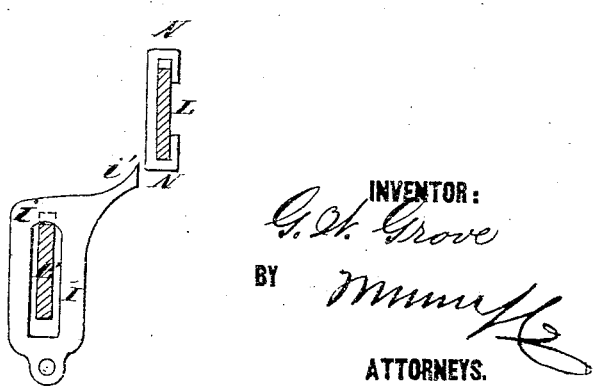
WITNESSES:
C. Naveux
John Goethals
INVENTOR:
G. W. Grove
BY
Munn & Co
ATTORNEYS.
JAMES R OSGOOD & CO BOSTON

UNITED STATES PATENT OFFICE.

GEORGE W. GROVE, OF LINNVILLE, OHIO.

IMPROVEMENT IN BEAM-SCALES.

Specification forming part of Letters Patent No. 183,156, dated October 10, 1876; application filed August 7, 1876.

*To all whom it may concern:*

Be it known that I, GEORGE W. GROVE, of Linnville, in the county of Licking and State of Ohio, have invented a new and useful Improvement in Attachment for Beam-Scales, of which the following is a specification:

Figure 1 is a side view of a beam-scales, to which my improvement has been applied. Fig. 2 is a top view of the same. Fig. 3 is a cross-section of the same, taken through the line $x\,x$, Fig. 1.

Similar letters of reference indicate corresponding parts.

The object of this invention is to furnish an improved attachment for beam-scales for determining net weight when gross is weighed, and also for dividing weights, as in stock-scales, and which shall be simple in construction and convenient in use.

The invention will first be described in connection with the drawing, and then pointed out in the claim.

A is the hollow pedestal. B is the holder for the pan C. Upon the opposite sides of the standard of the pan-holder B are formed arms $b'$, which are curved downward and upward, and have eyes formed in their upper ends to receive the knife-edges $d^1$, formed upon the side bars of the frame D, to which the beam E is attached. To the sides of the forward part of the frame D are attached knife-edges $d^2$, which rest in eyes formed in the ends of the arms F, formed upon or rigidly attached to the pedestal A. Upon a screw, $d^3$, attached to the rear end of the frame D, is screwed the balancing-weight G. To the forward end of the beam E is attached the rod H, to receive the weights when heavy articles are to be weighed. The beam E is provided with a scale of division-marks, and has a pea or counterpoise-weight, I, in the usual way. J is an arm attached to the rear side of the top of the pedestal A, to enter a loop, K, attached to the rear part of the frame D, to limit the play of the beam E. L is a beam, placed parallel with and a little higher than the beam E, and the rear or inner end of which is attached to an arm, M, attached to one of the arms F or to the pedestal A, so that the said beam L may be stationary and rigid. The beam L is provided with a scale of division-marks corresponding exactly with the marks upon the beam E. Upon the stationary beam L is placed a sliding bar, N, upon which is formed a scale of division-marks corresponding exactly with those upon the beams E L, but numbered from both ends. The bar N is provided with points at its ends to enter the notches in the upper edge of the beam L, to prevent the said bar from slipping when adjusted.

When the tare is to be weighed first, as, for instance, in retailing butter, the vessel is weighed first, the bar N is moved outward until its inner end corresponds with the pointer $i'$ of the link of the counterpoise-weight I. The butter is then put in, and is balanced by adjusting the weight I, and the net weight of the butter will be read from the bar N, opposite the pointer $i'$. If the gross weight is to be obtained first, the article and its package are weighed, and the sliding bar N is moved inward until its outer end corresponds with the pointer $i'$. The article is then taken out of the package, the package is weighed, and the net weight is read from the bar N, opposite the pointer $i'$, counting from the outer end of said bar. This bar, being figured from both ends, will weigh on and off, as the case may be, and being an adjustable slide instead of a removable plate, it will count up any number of pounds by adding or subtracting the extra weights, as is done in common scales.

What I claim is—

In beam-scales, the bar N, graduated from each end, and sliding on a stationary beam, L, parallel to the beam E, as and for the purpose specified.

GEORGE W. GROVE.

Witnesses:
JOSHUA B. CLOVER,
FRANK E. LAWRENCE.